United States Patent
Price

(10) Patent No.: US 7,278,107 B2
(45) Date of Patent: Oct. 2, 2007

(54) METHOD, SYSTEM AND PROGRAM PRODUCT FOR MANAGING WINDOWS IN A NETWORK-BASED COLLABORATIVE MEETING

(75) Inventor: Christopher D. Price, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 757 days.

(21) Appl. No.: 10/316,680

(22) Filed: Dec. 10, 2002

(65) Prior Publication Data

US 2004/0109021 A1 Jun. 10, 2004

(51) Int. Cl.
*G06F 3/00* (2006.01)
(52) U.S. Cl. ............ 715/753; 715/520; 715/759; 715/788
(58) Field of Classification Search ......... 715/520, 715/751, 753, 759, 781, 788, 792
See application file for complete search history.

(56) References Cited

U.S. PATENT DOCUMENTS

| | | | |
|---|---|---|---|
| 5,561,811 A * | 10/1996 | Bier ............................ 710/5 |
| 5,608,426 A | 3/1997 | Hester |
| 5,617,539 A * | 4/1997 | Ludwig et al. ............. 709/205 |
| 5,729,704 A | 3/1998 | Stone et al. |
| 5,790,127 A | 8/1998 | Anderson et al. |
| 5,835,129 A | 11/1998 | Kumar |
| 5,874,960 A * | 2/1999 | Mairs et al. ................ 715/733 |
| 5,887,170 A | 3/1999 | Ansberry et al. |
| 5,909,213 A * | 6/1999 | Martin ........................ 715/753 |
| 5,933,597 A * | 8/1999 | Hogan ........................ 709/204 |
| 5,949,414 A * | 9/1999 | Namikata et al. ........... 715/753 |
| 5,995,096 A | 11/1999 | Kitahara et al. |
| 6,026,409 A * | 2/2000 | Blumenthal ............... 707/104.1 |
| 6,353,450 B1 | 3/2002 | DeLeeuw |
| 6,384,840 B1 | 5/2002 | Frank et al. |
| 6,411,988 B1 * | 6/2002 | Tafoya et al. ............... 709/204 |
| 6,496,201 B1 * | 12/2002 | Baldwin et al. ............. 715/753 |
| 6,570,590 B1 * | 5/2003 | Dubrow et al. ............. 715/751 |
| 6,728,784 B1 * | 4/2004 | Mattaway ................... 709/245 |
| 6,809,749 B1 * | 10/2004 | Chen et al. ................. 715/753 |
| 6,981,223 B2 * | 12/2005 | Becker et al. .............. 715/753 |
| 2004/0172588 A1 * | 9/2004 | Mattaway ................. 715/500.1 |

(Continued)

OTHER PUBLICATIONS

Shneiderman, "Designing the User Interface: Strategies for Effective Human-Computer Interaction", Copyright 1998, Addison Wesley Longman, Inc., 3rd edition, pp. 451-452.*

(Continued)

*Primary Examiner*—John Cabeca
*Assistant Examiner*—Alvin H Tan
(74) *Attorney, Agent, or Firm*—Daniel McLoughlin; Hoffman, Warnick & D'Alessandro, LLC

(57) ABSTRACT

Under the present invention, a source meeting partner can select a target application for sharing with one ore more destination meeting partners during a collaborative meeting. Upon selection of the target application, a portion of a meeting application window will be removed, and a window corresponding to the target application will be positioned to be viewable through the removed portion. If necessary, one or more navigators (e.g., scroll bars) can be provided to manipulate the target application window. Thus, the present invention allows the meeting application window and the target application window to be simultaneously viewable without requiring resizing or repositioning of either one.

6 Claims, 6 Drawing Sheets

U.S. PATENT DOCUMENTS

2004/0210847 A1* 10/2004 Berson et al. .............. 715/788
2006/0136837 A1* 6/2006 Ben-Shachar et al. ...... 715/783

OTHER PUBLICATIONS

Kim et al, "A work area adjustment method of a shared document in a multipoint multimedia conference system", Oct. 1999, ACM Press, pp. 131-134.*

Bier et al., "Toolglass and Magic Lenses: The See-Through Interface", Proceedings of Siggraph '93 (Anaheim, August), Computer Graphics Annual Conference Series, ACM, 1993, pp. 73-80.

Axel Kramer, "Translucent Patches—Dissolving Windows", UIST '94, ACM Symposium on User Interface Software and Technology, 1994, pp. 121-130.

Ishii et al., "Toward an Open Shared Workspace: Computer and Video Fusion Approach of Teamworkstation", Communications of the ACM, Dec. 1991, vol. 34, No. 12, pp. 37-50.

Harrison et al., "Transparent Layered User Interfaces: An Evaluation of a Display Design to Enhance Focused and Divided Attention", ACM: CHI Proceedings, 1995, pp. 1-11.

* cited by examiner

METHOD, SYSTEM AND PROGRAM PRODUCT FOR MANAGING WINDOWS IN A NETWORK-BASED COLLABORATIVE MEETING

BACKGROUND OF THE INVENTION

1. Field of the Invention

The present invention generally relates to a method, system and program product for managing windows in a network-based collaborative meeting. Specifically, the present invention allows a window for a target application to be viewed through a portion of a meeting application window so that both windows can be viewed at the same time.

2. Background Art

As the use of computer technology has increased, businesses and individuals are increasingly performing functions in an on-line or network environment. For example, today a group of individuals can collaborate on a project over the Internet. Such a capability alleviates the problems in collaborating that were caused by distance between the collaborators. To this extent, numerous software programs have been developed to foster collaboration over a network. Such programs range in functionality from providing audio and/or video communication between meeting partners, to allowing the meeting partners to share programs/applications between their respective computer systems. The latter of the two has become extremely valuable in network-based collaboration because it allows all meeting partners to view the same work product at the same time. For example, if meeting partner "A" is viewing and editing a document using a word processing program, and he/she decides to share the word processing program with meeting partner B," meeting partner "B" would be able to view the document as it is being worked on by meeting partner "A." Moreover, depending on the meeting software program being used, meeting partner "B" could even have the capability to edit the document his/herself.

Unfortunately, as helpful as these programs can be, they have various drawbacks. For example, window management has become a big problem especially on the host or source computer system. Specifically, when a "source" meeting partner decides to share an application with one or more "destination" meeting partners, the computer display of the source meeting party must accommodate both a window for the meeting application as well as a window for the shared program. Thus, one window must overlap another, or the source meeting partner must resize and/or reposition the windows. Either option is not very attractive because in the case of the former, both windows typically display information that is useful during the collaborative meeting. Thus, occlusion of either window could hamper the collaboration process. In the case of the latter, constant resizing and repositioning is a very inefficient and tedious way to collaborate. Moreover, if the source meeting partner maximizes one of the windows (e.g., the shared application window), the other window will be completely hidden from view.

In view of the foregoing, there exists a need for a method, system and program product for managing windows in a network-based collaborative meeting. Specifically a need exists for a system that allows both a shared application window and a meeting application window to be simultaneously viewable without requiring repositioning or re-sizing of either window. A further need exists for the capability to resize either window without occluding the other window.

SUMMARY OF THE INVENTION

In general, the present invention provides a method, system and program product for managing windows in a network-based collaborative meeting. Specifically, under the present invention, a portion of a meeting application window is removed when a target application/program is designated for sharing during the collaborative meeting. Once the portion has been removed, the window for the target application is positioned so that it can be viewed through the removed portion of the meeting application window. If needed, navigators such as scroll bars will be provided to manipulate the target application window. The present invention allows the target application window and the meeting application window to be viewed simultaneously without requiring repositioning or re-sizing of either window. Moreover, even if the target application window is maximized, the meeting application window will not be occluded.

According to a first aspect of the present invention, a method for managing windows in a network-based collaborative meeting is provided. The method comprises: (1) accessing a meeting application window pertaining to the network-based collaborative meeting; (2) removing a portion of the meeting application window; and (3) viewing a window corresponding to a shared target application through the removed portion of the meeting application window.

According to a second aspect of the present invention, a system for managing windows in a network-based collaborative meeting is provided. The system comprises: (1) a removal system for removing a portion of a meeting application window; and (2) a positioning system for positioning a window corresponding to a shared target application to be viewable through the removed portion of the meeting application window.

According to a third aspect of the present invention, a program product stored on a recordable medium for managing windows in a network-based collaborative meeting is provided. When executed, the program product comprises: (1) program code for removing a portion of a meeting application window; and (2) program code for positioning a window corresponding to a shared target application to be viewable through the removed portion of the meeting application window.

Therefore, the present invention provides a method, system and program product for managing windows in a network-based collaborative meeting.

BRIEF DESCRIPTION OF THE DRAWINGS

These and other features of this invention will be more readily understood from the following detailed description of the various aspects of the invention taken in conjunction with the accompanying drawings in which.

Figure 1:
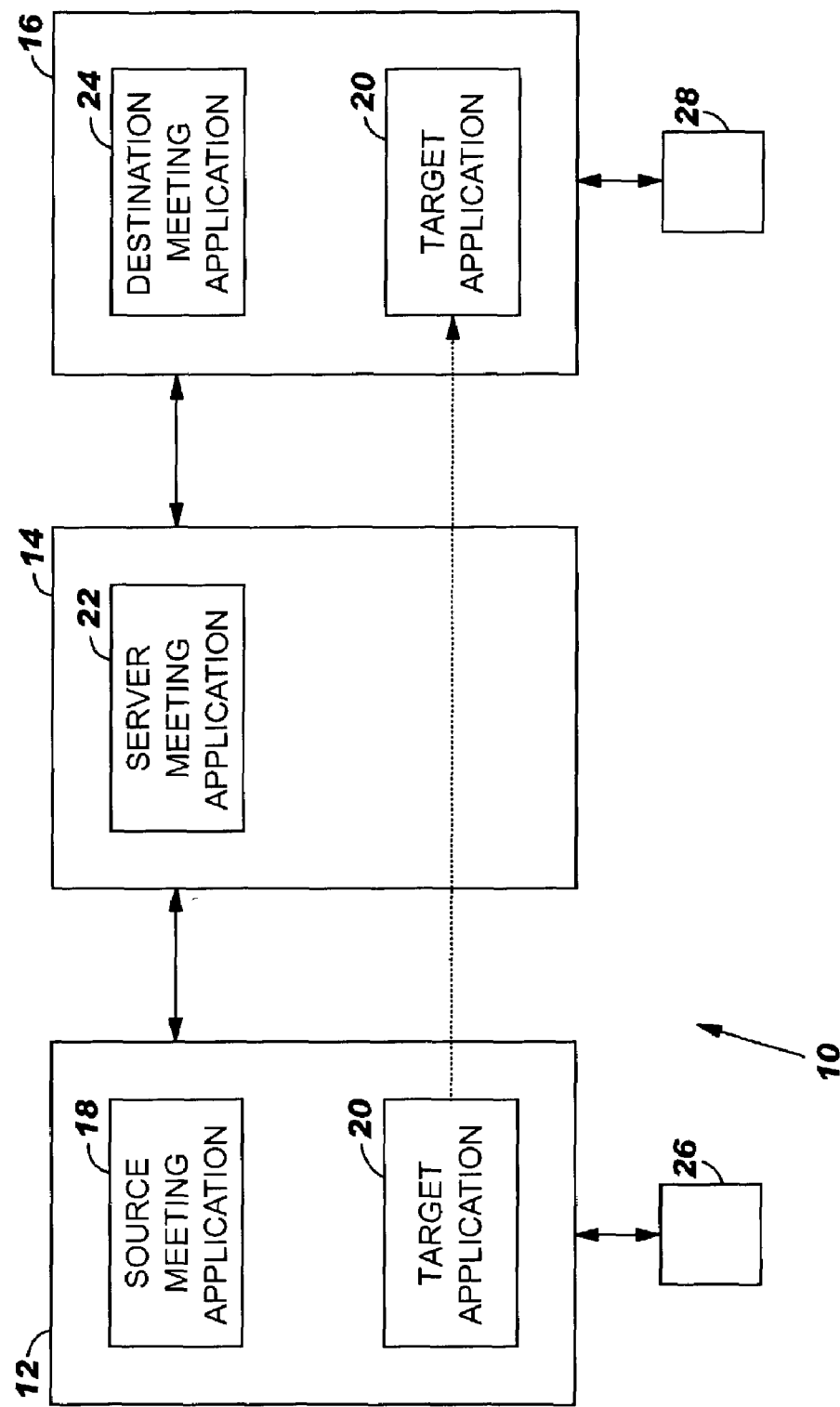
FIG. 1 depicts a related art collaborative meeting system.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system and program product for managing windows in a network-based collaborative meeting. Specifically, under the present invention, a portion of a net meeting window is removed when a target application/program is designated for sharing during the collaborative meeting. Once the portion has been removed, the window for the target application is positioned so that it can be viewed through the removed portion of the meeting application window. If needed, navigators such as scroll bars will be provided to manipulate the target application window. The present invention allows the target application window and the meeting application window to be viewed simultaneously without requiring repositioning or resizing of either window. Moreover, even if the target application window is maximized, the meeting application window will not be occluded.

Referring to FIG. 1, a related-art collaborative meeting system 10 is shown. In general, collaborative meeting system 10 is for conducting collaborative meetings between source meeting partner 26 and destination meeting partner 28 over a network such as the Internet, a LAN, a WAN, a VPN, etc. As shown, collaborative meeting system 10 includes source system 12, server 14 and destination system 16. These systems 12, 14 and 16 are intended to represent any type of computerized systems that can run applications such as collaborative meeting applications, and can be used to communicate over a network. For example, source system 12 could be a personal computer, a workstation, a personal digital system, etc. To engage in a collaborative meeting, each system will have its own set of meeting application program code. To this extent, source system 12 includes source meeting application 18, server 14 includes server meeting application and destination system 16 includes destination meeting application 24.

The collaborative meeting system 10 shown in FIG. 1 is well known in the art and as such, will not be described in detail herein. In general, the meeting applications 18, 22 and 24 foster a collaborative meeting between source meeting partner 26 and destination meeting partner 28. Meeting applications 18, 22 and 24 typically allow "target" applications/programs to be shared between source system 12 and destination system 16. For example, assume target application 20 is a word processing program. If source meeting partner 26 elects to share target application 20 with destination meeting partner 28, destination meeting partner 24 will be able to view the word processing documents as source meeting partner 26 views them. This allows both meeting partners 26 and 28 to effectively collaborate on the documents.

Figure 2:
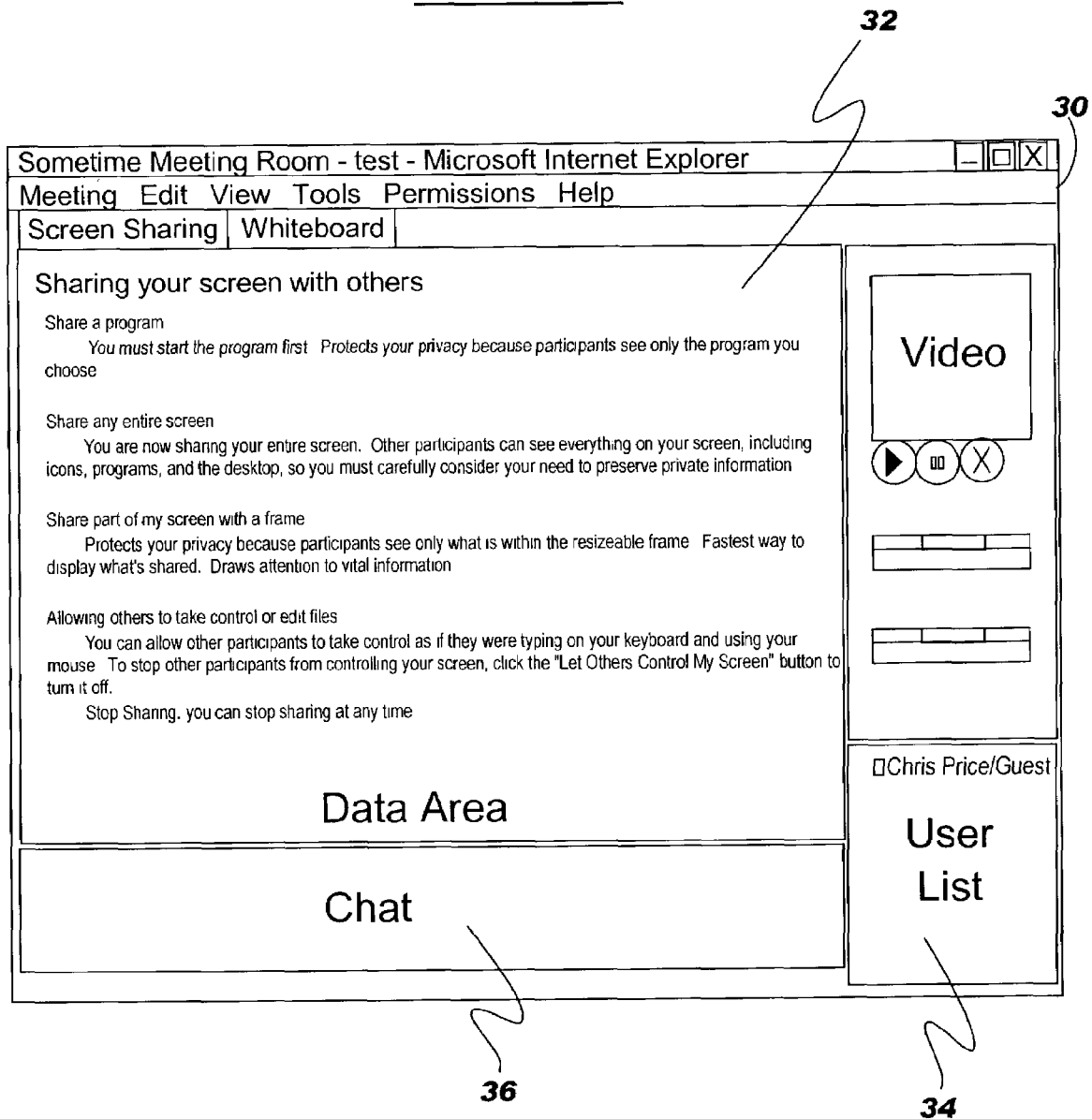
FIG. 2 depicts a meeting application window as generated by the related art system of FIG. 1

Referring now to FIG. 2, meeting application window 30 as it would appear on source system 12 is shown. Meeting application window 30 is generated and displayed by source meeting application 12 and provides the mechanisms by which source meeting partner 26 can collaborate with destination meeting partner 28. To this extent, destination meeting application 24 will typically generate and display a similar window that destination meeting partner 28 can use to collaborate with source meeting partner 26. As depicted, meeting application window 30 includes data area 32, user list 34 and chat area 36. Data area 38 lists various collaboration options available to source meeting partner 26. For example, source meeting partner 26 could share individual applications with other meeting partners, share an entire "screen," grant permission to other meeting partners to take control of or edit documents, etc. User list 34 lists all users who can participate in the collaborative meeting. By highlighting individual users, meeting partner 26 can collaborate in different ways. For example, meeting partner 26 could share a target application with meeting partner 28, while sharing an entire "screen" with another meeting partner (not shown). Chat area 36 provides a medium (i.e., "chatting") by which meeting partners communicate with each other.

Figure 3:
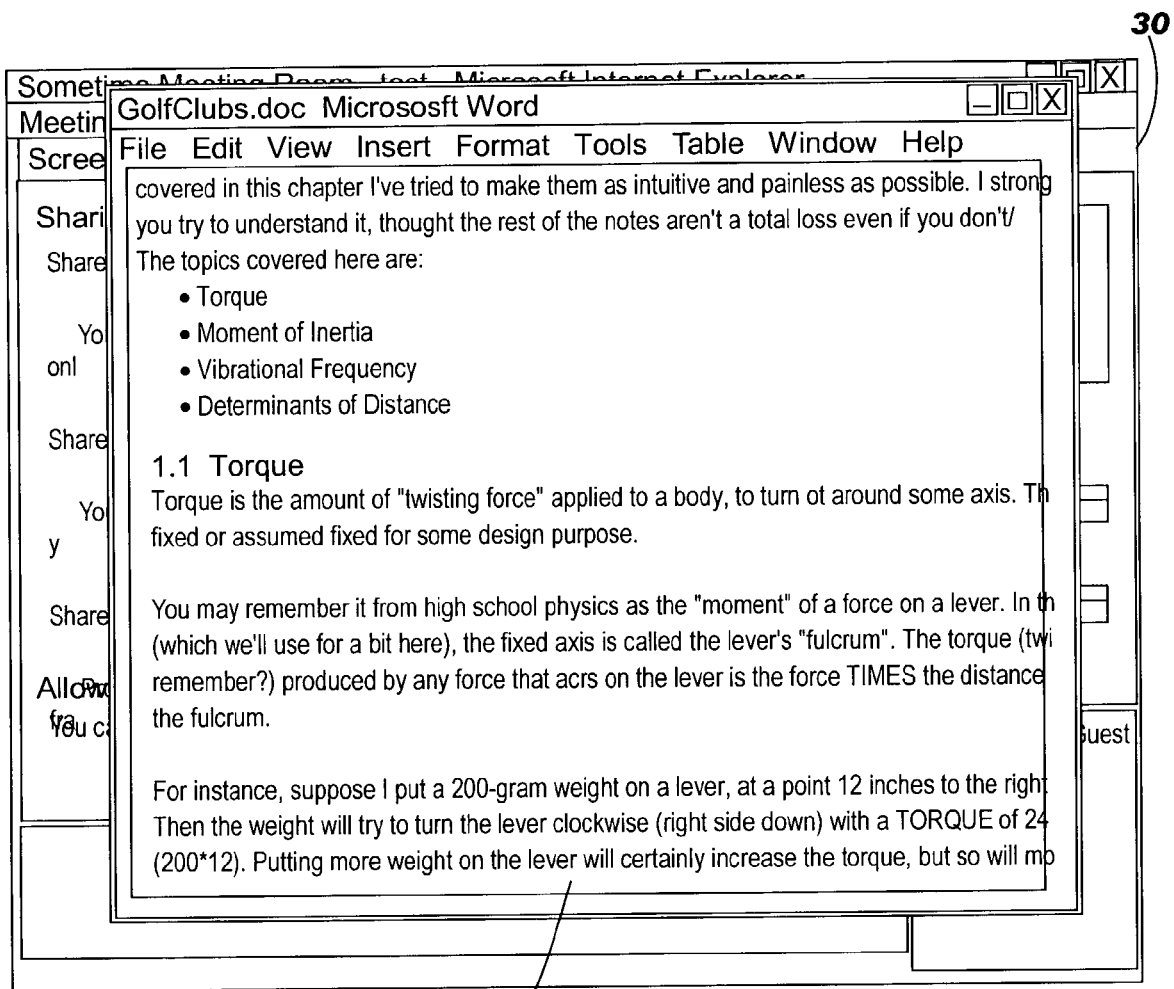
FIG. 3 depicts a meeting application window as occluded by a target application window according to the related art system of FIG. 1.

One problem with collaborative system 10 is that when target application 20 is shared, meeting application window 30 is occluded. Specifically, referring to FIG. 3, once target application 20 is shared, meeting application window 30 is hidden behind window 38 corresponding to the shared target application 20 (hereinafter "target application window"). For example, assume that source meeting partner 26 was collaborating with destination meeting partner 28 and elected to share a word processing program with him/her. In this case, target application window 38 corresponding to the word processing program would be displayed on "top of" meeting application window 30. Although this allows source meeting partner 26 to completely view target application window 38, meeting application window 30 and the useful information therein is occluded. If source meeting partner 26 wishes to view meeting application window 30, he/she must either hide/occlude target application window 38 or spend time resizing or repositioning windows 30 and 38 so that they are both visible. Neither option is optimal nor efficient for collaborating on a project.

Figure 4:
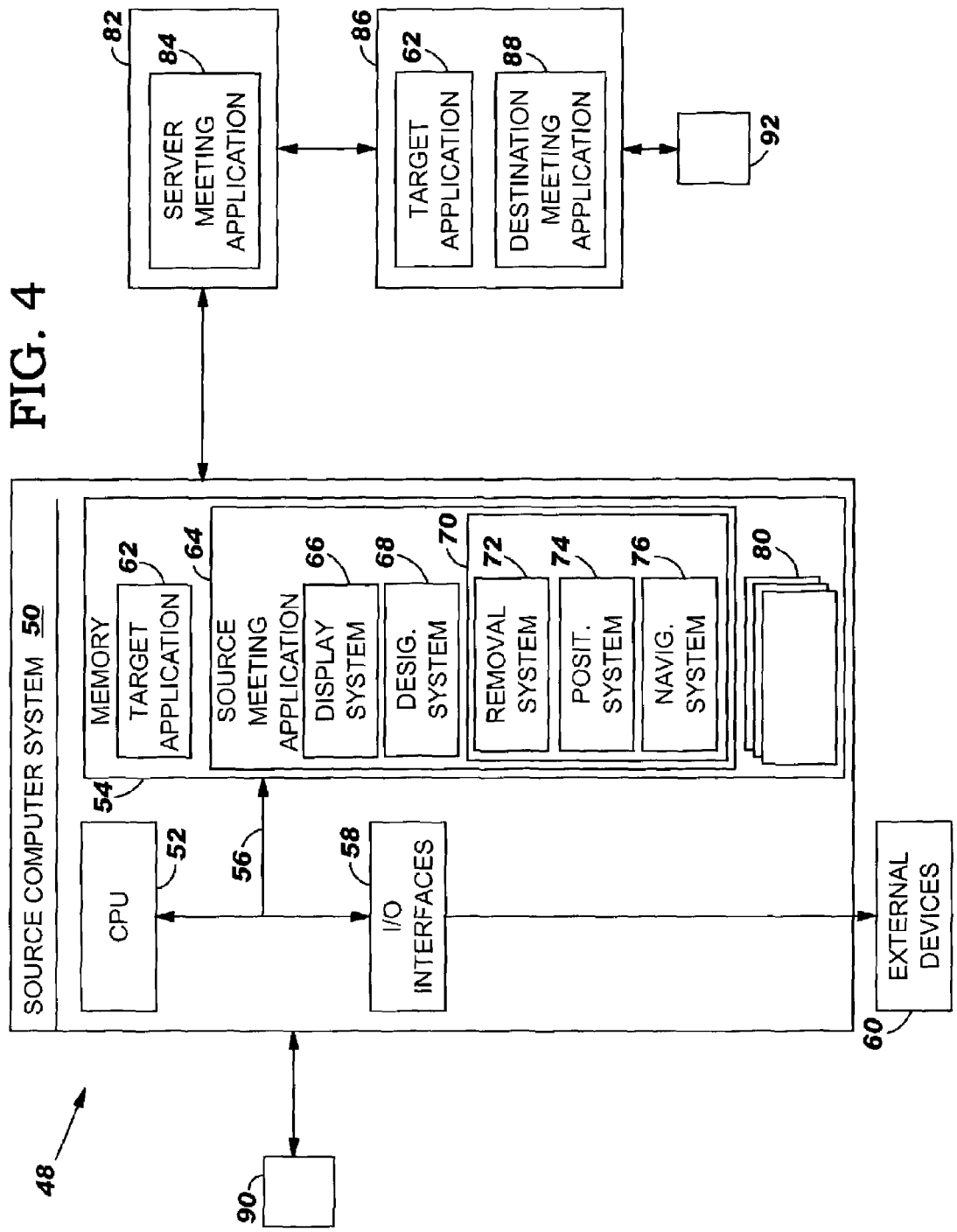
FIG. 4 depicts a collaborative meeting system according to the present invention.

Referring now to FIG. 4, collaborative meeting system 48 according to the present invention is shown. As depicted, source computer system 50 generally comprises central processing unit (CPU) 52, memory 54, bus 56, input/output (I/O) interfaces 58 and external devices/resources 60. CPU 52 may comprise a single processing unit, or be distributed across one or more processing units in one or more locations, e.g., on a client and server. Memory 54 may comprise any known type of data storage and/or transmission media, including magnetic media, optical media, random access memory (RAM), read-only memory (ROM), a data cache, a data object, etc. Moreover, similar to CPU 52, memory 54 may reside at a single physical location, comprising one or more types of data storage, or be distributed across a plurality of physical systems in various forms.

I/O interfaces 58 may comprise any system for exchanging information to/from an external source. External devices/resources 60 may comprise any known type of external device, including speakers, a CRT, LED screen, hand-held device, keyboard, mouse, voice recognition system, speech output system, printer, monitor, facsimile, pager, etc. Bus 56 provides a communication link between each of the components in source computer system 50 and likewise may comprise any known type of transmission link, including electrical, optical, wireless, etc. In addition, although not shown, additional components, such as cache memory, communication systems, system software, etc., may be incorporated into source computer system 50. It should also be understood that although not shown for brevity purposes, server 82 and destination computer system 86 typically include components (e.g., CPU, memory, bus, I/O interfaces, external devices, etc.) similar to computer system 50.

Although not shown, one or more databases could also be used to provide storage for information such as, for example, user preferences, application data, etc. Each such database may include one or more storage devices, such as a magnetic disk drive or an optical disk drive. In another embodiment, the databases could include data distributed across, for example, a local area network (LAN), wide area network (WAN) or a storage area network (SAN). The databases may also be configured in such a way that one of ordinary skill in the art may interpret it to include one or more storage devices.

Under the present invention, source meeting partner 90 utilizes source computer system 50 to hold a collaborative meeting with destination meeting partner 92 (who utilizes destination computer system 86). Server 82 is shown to illustrate that the collaborative meeting between source meeting partner 90 and destination meeting partner 92 could be held over a network such as the Internet, a wide area network (WAN), a local area network (LAN), a virtual private network (VPN), a wireless network, or other network, etc. To this extent, source computer system 50, server 82 and destination computer system 86 are intended to represent any computerized system that can carry out the functions described herein. For example, systems 50, 82 and 86 could be personal computers, workstations, laptops, personal digital assistants, etc. It should be understood that communication between source computer system 50, destination computer system 86 and server 82 can occur via a direct hardwired connection (e.g., serial port), or via an addressable connection in a client-server (or server-server) environment which may utilize any combination of wireline and/or wireless transmission methods. In the case of the latter (and as indicated above), the server and client may be connected via the Internet, a WAN, LAN, VPN, etc. The server and client may utilize conventional network connectivity, such as Token Ring, Ethernet, Wi-Fi or other conventional communications standards. Where the client communicates with the server via the Internet, connectivity could be provided by conventional TCP/IP sockets-based protocol. In this instance, the client would utilize an Internet service provider to establish connectivity to the server.

As depicted, source computer system 50, server 82 and destination computer system 86 each include a respective meeting application 64, 84 and 88. These applications provide the functionality for source meeting partner 90 and destination meeting partner 86 to engage in a collaborative meeting over a network as shown. It should be understood that only one source and destination meeting partner has been shown for illustrative purposes only and that the teachings described herein could be utilized in a collaborative meeting with any quantity of meeting partners.

Shown in memory 54 of source computer system 50 is target application 62 and source meeting application 64. Source meeting application 64 could include components of any collaborative meeting application now known or later developed that allows meeting partners 90 and 92 to engage in a collaborative meeting in which target application 62 is shared. Under the present invention, however, source meeting application 64 will work in conjunction with window management system 70 to provide an effective way to view both a window corresponding to target application 62 as well as a window corresponding to source meeting application 64.

As depicted, source meeting application includes display system 66 and designation system 68. Display system 66 will generate and display a meeting application window (e.g., similar to meeting application window 30 of FIG. 2) upon initiation of a collaborative meeting by source meeting partner 90. Once a collaborative meeting is commenced, designation system 68 allows source meeting partner 90 to select one or more target applications 62 for sharing with destination meeting partner 92. To this extent, it should be appreciated that the manner in which the target application 62 is designated is not meant to be limiting. For example, source meeting partner 90 could select one or more "buttons" on a displayed meeting application window. Upon such a selection, designation system 68 would communicate the necessary data so that target application 62 is shared with destination meeting partner 92.

Under the present invention, when target application 62 is designated for sharing, window management system 70 will automatically manage the target application window and the meeting application window. Specifically, as shown, window management system includes removal system 72, positioning system 74 and navigator system 76. When source meeting partner 90 designates target application 62 for sharing, removal system 72 will automatically remove a portion of the meeting application window to create a hole or "hollowing-out" thereof. Once removed, positioning system 74 will position the target application window behind the removed portion so that it can be viewed therethrough. As will be further described below, the removal of a portion of the meeting application window, and the subsequent positioning of the target application window is typically accomplished with a set (e.g., one or more) of logical operations. Positioning the target application window in this manner allows both windows to be viewed simultaneously without having to reposition or resize either window. Moreover, in the event that the entire target application window does not fit within the removed portion of the meeting application window, navigator system 76 will automatically generate and display one or more navigators (e.g., scroll bars) so that the target application window can be manipulated.

Figure 5:
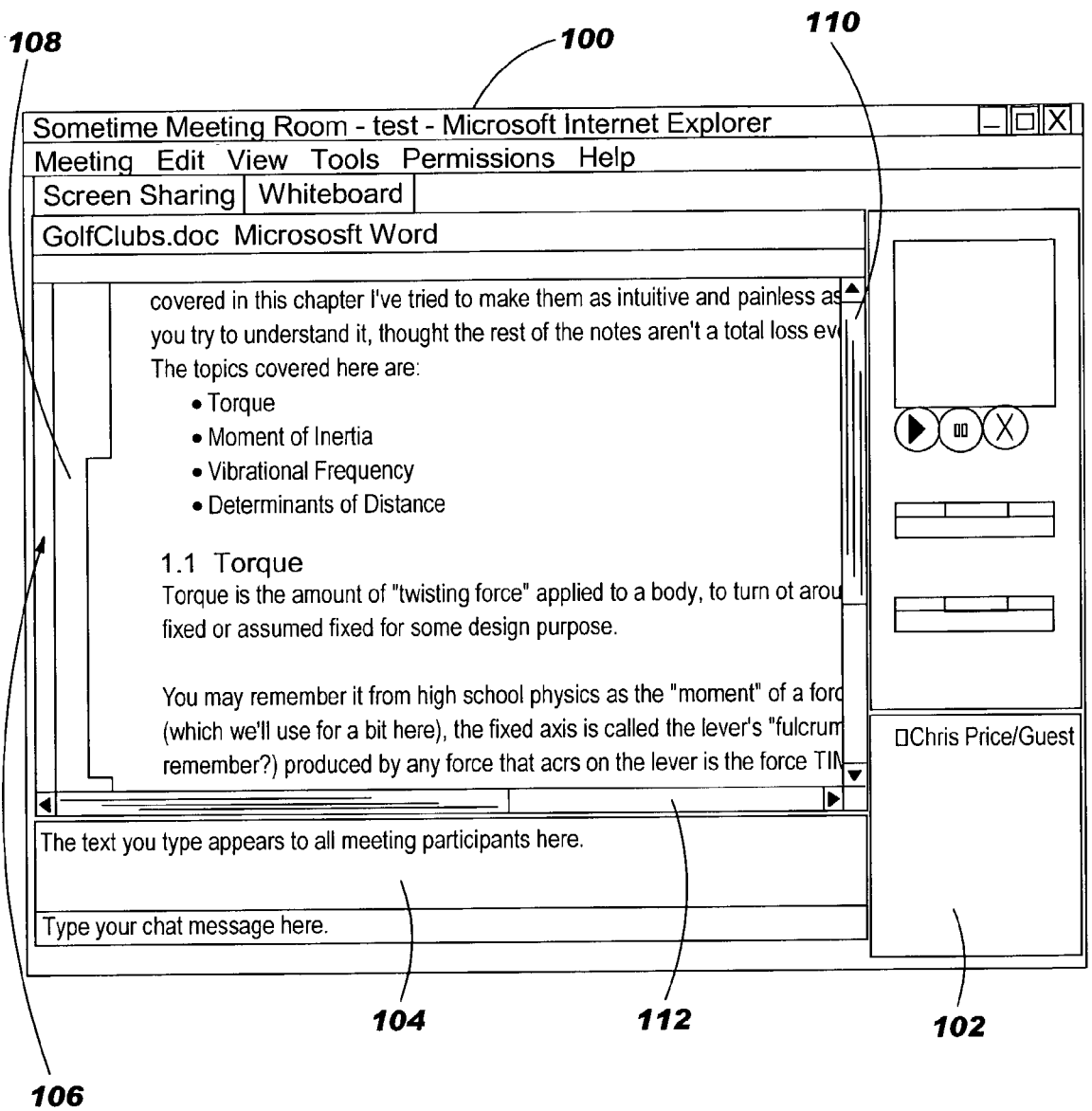
FIG. 5 depicts a target application window as viewable through a removed portion of a meeting application window according to the present invention.

Referring now to FIG. 5, the positioning of the target application window under the present invention is shown. As depicted, meeting application window 100 can include sections similar to meeting application window 30 of FIGS. 2-3. Specifically, meeting application window 100 can include user list 102, chat area 104 and data area 106. However, as shown, data area 106 has been removed by removal system 72 and target application window 108 has been positioned by positioning system 74 to be viewable through the removed portion. As indicated above, the positioning of target application window 108 in this manner is typically accomplished with a set of logical operations. Shown below is one such methodology:

Let RgnX be a window region of target application window 108 (defined as a "region" instead of on-screen coordinates in the event that target application window 108 is non-rectangular).

Let RgnY be a rectangular region with the on-screen coordinates of data area 106 of meeting application window 100.

Let RgnZ be a rectangular region with the on-screen coordinates of meeting application window 100 as a whole.

Let RgnC be the region of meeting application window 100 that will remain after data area 106 is removed $$RgnC = (RgnZ) XOR (RgnX \text{ AND } RgnY)$$

Figure 6:
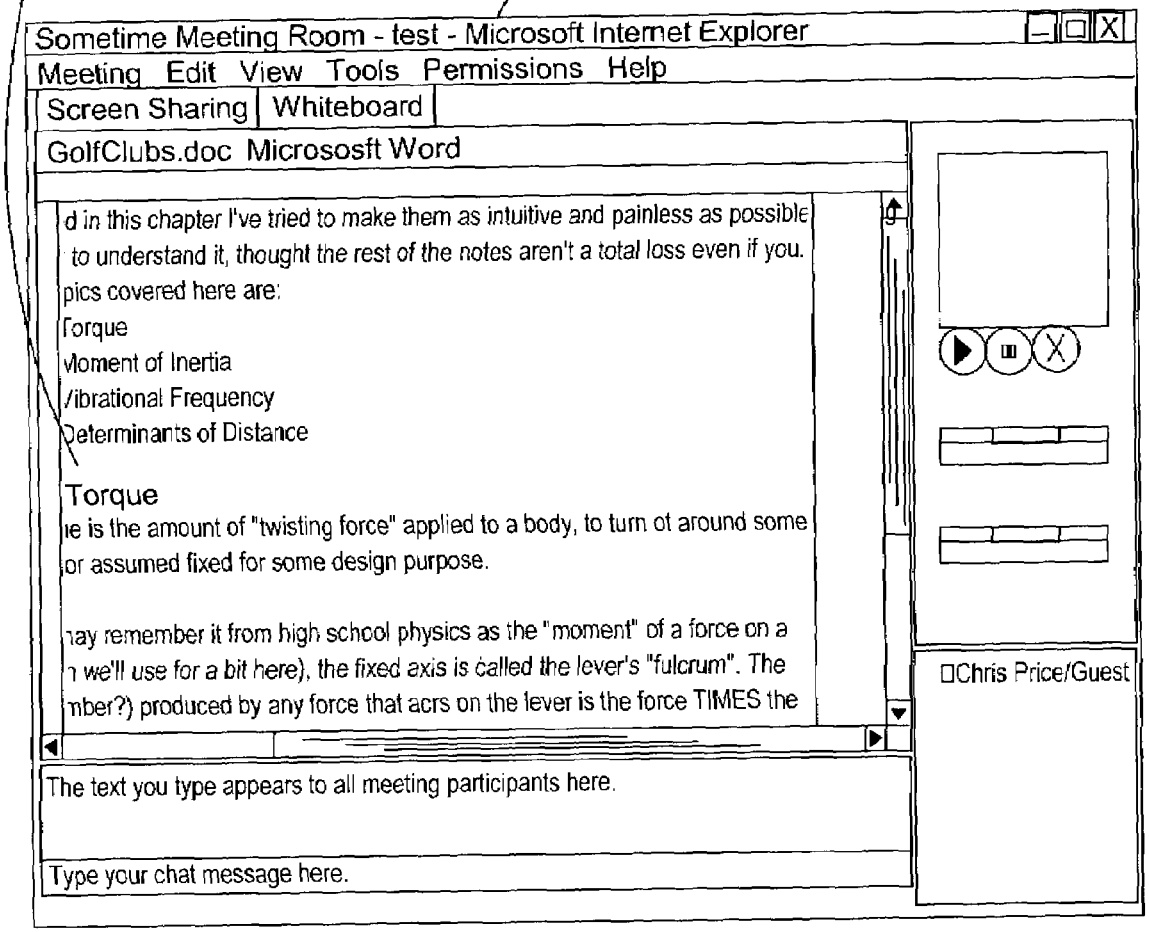
FIG. 6 depicts a maximized target application window as viewable through a removed portion of a meeting application window according to the present invention.

As further shown in FIG. 5, scroll bars 110 and 112 have been generated and displayed. Scroll bars 110 and 112 allows target application window 108 to be manipulated in its normal fashion. For example, if source meeting partner 90 wishes to view a paragraph of the displayed document that is not in view, he/she could use scroll bars 110 and/or 112 to bring the desired paragraph into view. When positioning target application window 108 to be viewable through a removed portion of meeting application window 100 in this manner, both windows are viewable simultaneously without requiring repositioning or resizing. Moreover, the present invention allows either window to be maximized/resized without affecting the viewability of the other. For example, referring to FIG. 6, target application window 108 has been maximized. As can be seen, this has not affected the viewability, size or position of meeting application window 108. Moreover, scroll bars 110 and/or 112 can continue to be used to manipulate target application window 108.

It should be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls source computer system 50 such that it carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, it should be understood that window management teachings described herein could be utilized to provide effective window management on destination computer system 86. Moreover, although shown as part of source meeting application 64, window management system 70 could exist as a separate system that works in conjunction with source meeting application 64.

I claim:

1. A method for managing windows in a network-based collaborative meeting, comprising:

accessing a meeting application window pertaining to the network-based collaborative meeting;

removing a portion of the meeting application window, the portion being determined based on a data portion of the meeting application window and a region of a window corresponding to a shared target application, wherein the removing step comprises:

determining on-screen coordinates of the data portion of the meeting application window;

determining on screen coordinates of the meeting application window;

determining the region of the window corresponding to the target application;

determining a value by performing an AND logical operation of the region of the target application and the on-screen coordinates of the data portion of the meeting application window; and determining the portion to be removed by performing an exclusive-OR logical operation of the value and the on-screen coordinates of the meeting application window; and removing the portion from the meeting application window; and viewing the window corresponding to the shared target application through the removed portion of the meeting application window.

2. The method of claim 1, further comprising designating a target application for sharing in the network-based collaborative meeting, prior to removing the portion of the meeting application window.

3. The method of claim 1, wherein the meeting application window is accessed via a source meeting application on a source computer system.

4. The method of claim 1, further comprising providing a set of navigators for manipulating the window corresponding to the target application as viewed through the removed portion of the meeting application window.

5. The method of claim 1, further comprising sharing the target application with a destination computer system.

6. The method of claim 5, wherein the destination computer system includes a destination meeting application.

* * * * *